United States Patent
McGlynn et al.

(10) Patent No.: US 6,322,829 B1
(45) Date of Patent: Nov. 27, 2001

(54) SAVORY FILLINGS AND FOOD PRODUCTS INCLUDING THESE FILLINGS

(75) Inventors: Michael C. McGlynn, Murfreesboro, TN (US); John R. Graves, Edina, MN (US); Richard L. Kittleson, Andover, MN (US); Doug Bethune, Plymouth, MN (US); Usha B. Bhatia, St. Paul, MN (US); Nicola Jones; Kathryn E. Robertson, both of Northumberland (GB)

(73) Assignee: The Pillsbury Company, Minneapolis, MN (US)

( * ) Notice: Subject to any disclaimer, the term of this patent is extended or adjusted under 35 U.S.C. 154(b) by 0 days.

(21) Appl. No.: 09/836,132

(22) Filed: Apr. 17, 2001

Related U.S. Application Data

(63) Continuation of application No. 08/708,777, filed on Sep. 5, 1996, now abandoned.

(51) Int. Cl.[7] .................................................. A23C 20/00
(52) U.S. Cl. ........................... 426/89; 426/572; 426/582; 426/585; 426/549
(58) Field of Search ................................ 426/94, 99, 582, 426/549, 572, 585, 589, 613, 89

(56) References Cited

U.S. PATENT DOCUMENTS

| | | | |
|---|---|---|---|
| 3,345,185 * | 10/1967 | Pisani et al. . | |
| 3,492,127 * | 1/1970 | Ketch et al. . | |
| 3,833,741 * | 9/1974 | Katz . | |
| 3,843,808 * | 10/1974 | Ziccarelli . | |
| 4,110,476 * | 8/1978 | Rhodes . | |
| 4,145,454 * | 3/1979 | Dea et al. . | |
| 4,146,652 * | 3/1979 | Kahn . | |
| 4,244,977 * | 1/1981 | Kahn . | |
| 4,244,983 * | 1/1981 | Baker . | |
| 4,293,573 * | 10/1981 | Bradley, Jr. . | |
| 4,379,175 * | 4/1983 | Baker . | |
| 4,409,251 * | 10/1983 | Higgins . | |
| 4,434,186 * | 2/1984 | Desia . | |
| 4,482,575 * | 11/1984 | Olds . | |
| 4,542,035 * | 9/1985 | Huang et al. . | |
| 4,612,198 * | 9/1986 | Wallin . | |
| 4,670,272 * | 6/1987 | Chen | 426/572 |
| 4,707,374 * | 11/1987 | King | 426/572 |
| 4,721,622 * | 1/1988 | Kingham . | |
| 4,724,152 * | 2/1988 | Baker . | |
| 4,752,494 * | 6/1988 | Tang | 426/572 |
| 4,753,812 * | 6/1988 | Wilson | 426/572 |
| 4,774,095 * | 9/1988 | Kleinschmidt | 426/579 |
| 4,818,554 * | 4/1989 | Giddey . | |
| 4,824,684 * | 4/1989 | Barry | 426/572 |
| 4,826,696 * | 5/1989 | Wilson | 426/572 |
| 4,840,813 * | 6/1989 | Greenberg . | |
| 4,919,947 * | 4/1990 | Barry | 426/572 |
| 5,059,433 * | 10/1991 | Yanien . | |
| 5,079,024 * | 1/1992 | Crane . | |
| 5,108,773 * | 4/1992 | Smith . | |
| 5,180,604 * | 1/1993 | Crane . | |
| 5,366,750 * | 11/1994 | Morano | 426/572 |
| 5,374,438 * | 12/1994 | Yost | 426/804 |
| 5,529,801 * | 6/1996 | Morano | 426/572 |
| 5,626,903 * | 5/1997 | Gautchier | 426/572 |
| 5,723,164 * | 3/1998 | Morano | 426/572 |
| 5,935,634 * | 8/1999 | Gamay | 426/582 |
| 5,968,583 * | 10/1999 | Gautchier | 426/572 |

FOREIGN PATENT DOCUMENTS

| | | |
|---|---|---|
| 0638488-A1 * | 2/1995 | (EP) . |
| 2032241 * | 5/1980 | (GB) . |
| 63202339 * | 8/1988 | (JP) . |
| WO-92/08361 * | 5/1992 | (WO) . |

* cited by examiner

*Primary Examiner*—Carolyn Paden
(74) *Attorney, Agent, or Firm*—Merchant & Gould P.C.

(57) ABSTRACT

Savory cheese fillings are described which can be frozen and still melt smoothly upon reheating, without fat separation, and which provide the creamy taste, texture, mouth feel, and other organoleptic properties of cheese. The filling may be used in a wide variety of food products.

41 Claims, 1 Drawing Sheet

SAVORY FILLINGS AND FOOD PRODUCTS INCLUDING THESE FILLINGS

This application is a continuation of application Ser. No. 08/708,777, filed Sep. 5, 1996, now abandoned which application(s) are incorporated herein by reference.

FIELD OF THE INVENTION

The invention relates generally to savory fillings and food products that contain these fillings. More specifically, the invention relates to fillings having desirable melting characteristics and to food products that contain these fillings.

BACKGROUND OF THE INVENTION

Food products filled with cheese either alone or in combination with other filling ingredients are known. Examples of such food products include pastas, pretzels, pasties, pies and the like. It is generally preferred to use a filling that contains a high proportion of real cheese due to the desirable taste, texture, and other organoleptic qualities obtained when real cheese is used.

However, the use of real cheese as a filling in food products can give rise to a number of difficulties. For example, the properties of the cheese can be difficult to control. One or more of the components of the cheese, such as fat or moisture, can separate from the cheese and possibly migrate into the other ingredients of the food product. The cheese may not melt smoothly or may be difficult to work with at ambient temperatures.

The prior art describes cheese fillings that attempt to overcome one or more of these problems. In U.S. Pat. No. 4,482,575 Olds et al. describe a cheese filling that is shelf stable and that can withstand extrusion and heating. The product is aerated and contains powdered cheese. U.S. Pat. No. 5,059,433 to Lee et al. describes pasta products that may have a cheese filing. The filling comprises dehydrated cheese and cheese paste, bread crumbs, whole eggs and other ingredients. This product is shelf stable at ambient temperatures. Morano, in U.S. Pat. No. 5,366,750, describes ultra-low water activity fillings that may contain cheese. The fillings contain ultra-high surface area cellulose and have a water activity below 0.6.

Products containing savory fillings, particularly those containing a fatty ingredient such as cheese or meat, can become unpalatable when stored in refrigerated or frozen temperatures and then reheated for consumption. One reason for this is that the filling components, such as fat and water, can separate when frozen and reheated. Fat and/or water separated from the filling can cause the filling to become runny or migrate into other food components, adversely affecting their characteristics such as taste and texture.

The prior art fillings are generally solid at ambient temperatures and become flowable at elevated temperatures. A need exists for savory fillings that are processable at ambient temperatures, which melt smoothly without separation of components at eating temperatures, and which have pleasing taste, mouthfeel 1, and other organoleptic properties.

SUMMARY OF THE INVENTION

The invention provides a savory filling which has a controlled melting profile, said filling comprising an amount of cheese effective to provide melting and organoleptic properties to the filling; a fat or oil in an amount effective to control the consistency of the filling; a humectant in an amount effective to reduce the water activity of the filling; and an effective amount of an emulsion stabilizer. The invention further provides food products that contain the savory filling of the invention. The consistency of the savory filling at ambient temperatures can vary significantly depending on the desired processing properties of the filling. The filling can be semi-solid at ambient temperatures, making it suitable for extrusion-based processing, or it can have a viscosity which makes it pumpable at ambient temperatures.

At eating temperatures, which typically are above 100° F. for savory food products, the filling of the invention attains a desirable viscosity which resembles that of melted cheese, but the filling surprisingly retains its integrity, substantially without separation of the fat or water components of the filing. This results in an organoleptically pleasing filling that can be used with a wide variety of food products.

The viscosity of the savory filling of the invention at eating temperatures above about 100° F. can range from about 70,000 centipoise to 200,000 centipoise, while maintaining the integrity of the filling components. The filling can attain a desirable mouthfeel and texture, and yet unexpectedly, the fat and water components remain in the filling without substantially migrating out of the filling.

The controlled melting profile of the inventive savory filling allows the filling to be cooled to freezing temperatures and reheated to a consistency similar to that of melted cheese, without separation into fat and water components that can migrate out of the filling and into the food product.

The term "wt-%" is used herein to denote the weight percentage based on the total filling weight unless otherwise specified. The term "savory" means that the overall taste of the filling is not sweet or that the filling does not contain added sweetening agents in amounts effective to impart a sweet flavor to the filling. The terms "filling" and "savory filling" are used interchangeably. Water activity, or $A_w$, is a measure of the unbound or free water available to support biological and chemical reactions in a system or particular environment. The water activity of a system may be determined by dividing the vapor pressure of pure water at a particular temperature into the vapor pressure of water in the system or environment at the same temperature.

BRIEF DESCRIPTION OF THE DRAWINGS

The drawing shows a viscosity profile of one example of the savory filling of the invention.

DETAILED DESCRIPTION OF THE INVENTION

Figure 1:
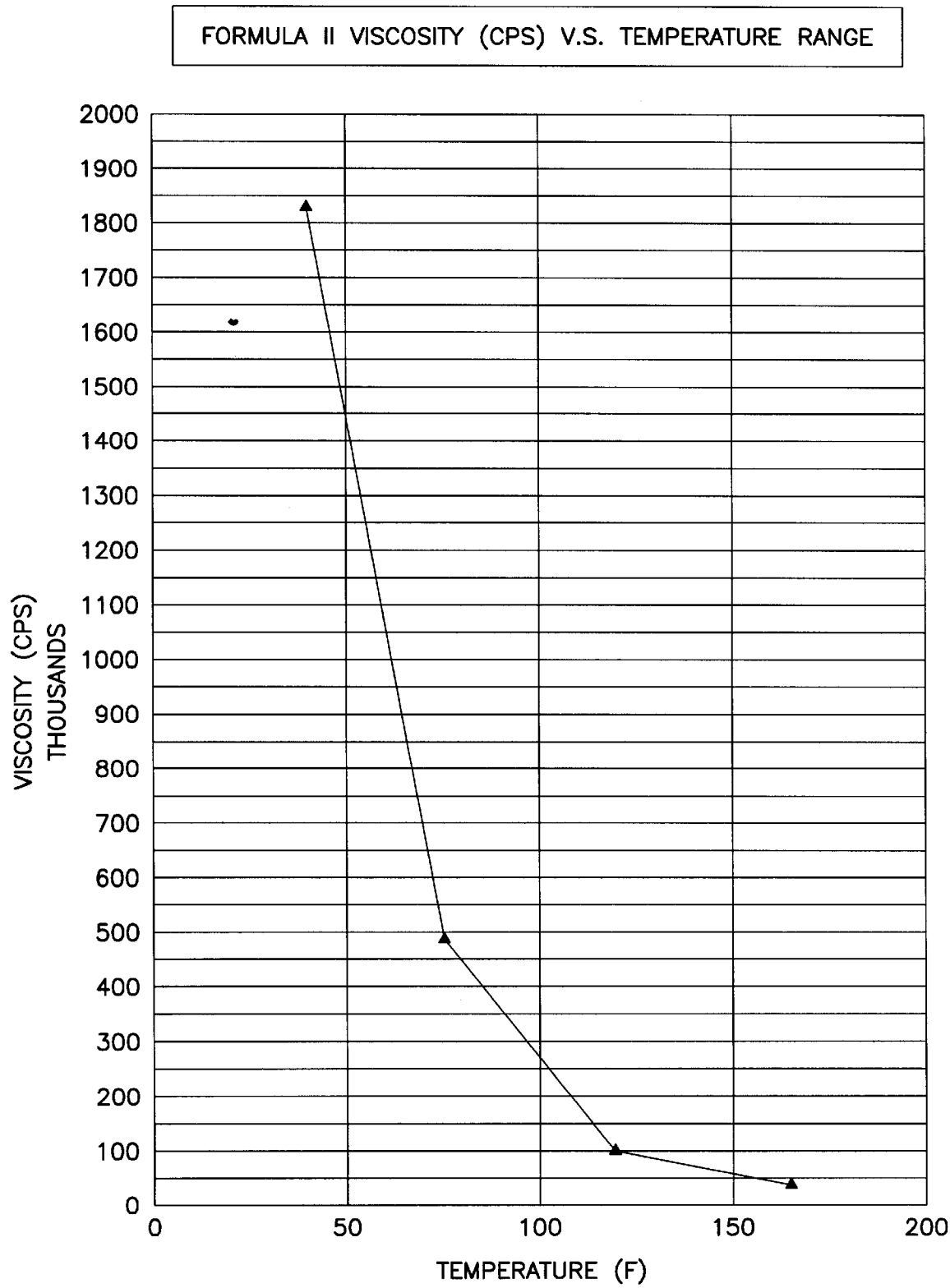

The invention is a savory filling which has a controlled melting profile, the filling comprising a an amount of cheese effective to provide melting and organoleptic properties to the filling, fat or oil in an effective amount to control the consistency of the filling; humectant in an amount effective to reduce the water activity of the filling; and an effective amount of an emulsion stabilizer as well as food products containing this filling.

The cheese which is present in the savory filling provides the filling with the creamy texture, full body and mouth feel, aroma and the other desirable organoleptic properties of real cheese. The cheese is preferably in its natural form, although some or all of the cheese may be in a processed form, such as cheese curds, cheese bases made by ultrafiltration, or dehydrated or powdered cheese. Although any cheese may be used in the filling of the invention, specific examples of cheeses which may be used include cheddar, colby, gruyere, brie, limburger, mozzarella, Swiss, white, Emmenthal, Parmesan, Neufchatel and full fat soft or cream cheeses, which may be used alone or in combination. To provide optimal organoleptic properties, the filling of the invention preferably contains at least about 20 wt-% cheese and more preferably about 40 to 75 wt-% cheese.

Other dairy components may also be present in the savory filling. The additional dairy ingredients may serve to build the dairy quality or protein content of the filling. Such components or ingredients include, for example, whey powder, non-fat dried milk or milk solids, and sodium caseinate. If used, added dairy ingredients can be present in an amount up to about 15%, preferably between about 0.5–9%, and more preferably between about 1–5%. The savory filling includes a fat and water emulsion that provides the desirable melting characteristics of the filling. This emulsion substantially prevents separation of the fat and water components of the filling, so that they resist seeping into other parts of the food product. Such seeping or migration can negatively affect the organoleptic properties of the food product. For example, if water or oil migrates into a pastry crust that surrounds the filling, the crust may become gummy or soggy.

The fat component of the fat and water emulsion may be provided entirely by the cheese portion of the filling. In a preferred embodiment additional fat or oil is added to the filling to provide the desired melting profile and viscosity. The additional fat may be any type of fat, shortening or oil from animal, vegetable or legume sources. The fat can have any degree of hydrogenation or can be non-hydrogenated. Fats useful in the invention include fats that are typically solid at room temperatures, such as butter or vegetable shortening. Other fats, such as tallow or lard, can also be used in the invention.

The fats or oils useful in the invention preferably have a mild flavor so as not to interfere with the cheese and other savory flavors of the filling. Alternatively, flavored fats or oils, such as garlic flavored oil or basil flavored oil can be used depending on the type of flavor characteristic desired for the filling.

Oils useful in the filling of the invention include, for example, hydrogenated vegetable oil, corn, cottonseed, coconut, peanut, palm kernel, soybean, and sunflower seed oil. Combinations of the various oils may be used if desired. The fat is present in an amount effective to form a stable emulsion that provides the filling with the desired controlled melting properties. If fat is added to the filling, it is preferably present in an amount ranging from about 10–30 wt-%, more preferably between about 12–25 wt-%, and even more preferably between about 15–18 wt-%. The total fat content of the filling, from the cheese and any added sources, should be sufficient to give the desired consistency and melting profile, and can range from about 10–60 wt-%, preferably from 30–50 wt-% and more preferably from 35–45 wt%.

Water is present in an amount sufficient to form a stable emulsion with the fat component of the filling. The water aids in the combination of filling ingredients and helps to uniformly disperse the ingredients. The amount of water present in the filling determines the phase properties of the emulsion. Preferably, sufficient water is present to form a stable oil-in-water (o/w) emulsion. Water can be added as a filling ingredient, and can also be present in the filling from condensation during processing, depending on the kind of processing involved in making the filling. Some types of cheese may also naturally contain water which contributes to the total water content of the filling. If water is added to the filling composition, it is preferably added in an amount up to about 20 wt-%, and is preferably added in amounts ranging from between about 5–10 wt-%. The total water content of the filling, from all the sources of water, can range from about 10–60 wt-%, preferably between 30–50 wt-%, and more preferably between 35–45 wt-%.

To minimize the free water present in the savory filling, thereby reducing the water activity of the filling, a humectant is included in the savory filling of the invention. Humectants serve to bind the free water present in the filling, making it unavailable for reaction and reducing the likelihood that moisture will migrate from the filling upon heating. The water activity ($A_w$) of the filling is controlled by the combination of the emulsion and humectants. Lowering water activity also restricts the growth of many microbes and therefore can improve the storage stability of the filling. To provide a savory filling that is organoleptically acceptable and to restrict migration of water from the filling, the Aw of the filling should be less than the $A_w$ of the rest of the food product. This results in water tending to migrate into rather than out of the filling. For example, if the filling is enrobed in a pastry crust, it is desired to maintain the crisp texture of the crust obtained when the crust is cooked. If the water activity of the filling is controlled to be lower than the water activity of the crust, then when the crust is cooked, water released from the crust can be absorbed by the filling. If the water activity of the filling is kept sufficiently low, even after the crust is cooked, the water activity of the filling remains lower than the crust, deterring moisture migration from the filling to the crust. Generally, the $A_w$ of the savory filling is less than about 0.92. Preferably the filling has an Aw of about 0.80 to 0.92.

Generally, the humectant can be comprised of any material that is able to absorb and retain water, or bind water, such as, for example, alcohols, certain saccharides, salts and mixtures thereof. Examples of usable alcohols include monohydric alcohols, diols, and/or polyols. More specifically, glycerol, propylene glycol, sorbitol, mannitol, and 1,2-propanediol. Sodium chloride, carboxymethylcellulose, sodium lactate and monosodium glutamate are also useful as humectants or water binders. Salts of any of these humectants or any other type of humectant are also useful. Although some sugars have humectant properties, the sweetness sugar imparts is not desirable in a savory filling. Therefore, it is preferred that the savory filling of the invention not contain sugar or any other sweetening agent.

Preferred humectants include sodium chloride, glycerol and carboxymethylcellulose, and combinations thereof, with a combination of sodium chloride and glycerol particularly preferred.

Although the amount will vary with the precise humectant or humectants employed, generally the filling of the invention contains about 2 to 20 wt-% humectant. Preferably the filling contains about 6 to 15 wt-% humectant. If a combination of sodium chloride and glycerol is used as the humectant system, sodium chloride is present in an amount ranging from about 0.5–4 wt-%, preferably 0.75–3 wt-% and more preferably 1–2 wt-%, and glycerol is present in an amount ranging from about 4–10 wt-%, preferably 5–8 wt-% and more preferably 6–7 wt-%. An advantage of using salt as a humectant is that it also acts as a flavoring agent in the filling formulation.

An emulsion stabilizer is added to the savory filling to prevent separation of the various filling components by maintaining the emulsion formed by the fat and water components during processing, cooling, optional cooking, optional freezing, and reheating. For example, this prevents oil or fat from "weeping" out of the filling on reheating. One factor determining the type and amount of stabilizer added to the filling is the amount of shearing force the filling is subjected to during its manufacture and subsequent processing. Generally, if a high amount of shear force is used to create the emulsion, a lesser amount of stabilizer is needed to stabilize the emulsion. In fact, if sufficiently high shear force is applied to the ingredients, an added emulsion stabilizer may not be necessary to attain the desired results in the filling.

Any of the known food grade emulsion stabilizers may be used in the savory filling of the invention. Useful classes of emulsion stabilizers include, for example, gums such as xanthan, alginate, carrageenan, guar gum and the like; polyphosphates and phosphate salts such as disodium phosphate, calcium phosphate, sodium hexametaphosphate and so on; and mono- and di- glycerides; and polymers such as starch. Preferred emulsion stabilizers include disodium phosphate, calcium phosphate, modified starch, sodium hexametaphosphate, sodium stearoyl lactate, lactoalbumin, alginate, xanthan, and mixtures thereof. The emulsion stabilizer is generally present in an amount of about 1 to 5 wt-%. If starch is used as an emulsion stabilizer, preferably it is modified to be able to withstand high shear, high temperatures and acidic pH values. Particularly preferred as emulsion stabilizers in the invention are xanthan gum at an amount up to about 0.6 wt-%, preferably between about 0.05–0.25 wt-%; sodium stearoyl lactate at an amount up to about 0.5 wt-%, preferably between about 0.1%–0.3 wt-%; and sodium hexametaphosphate at up to about 1.5 wt-%, preferably between about 0.5 wt-% and 0.1 wt-%.

A protein component may be added to the savory filling. These proteins are preferably derived from dairy sources so as not to interfere with the flavors imparted to the filling by the cheese component. The protein component provides a structure or matrix in the filling which may enhance the emulsion stability, thereby minimizing oil or water migration from the filling. The protein also contributes to the desired viscosity profile and melting characteristics of the filling. The protein can be added in the form of nonfat dry milk powder, skim milk powder, whey powder, sodium caseinate, soy protein powder, and the like. If an added protein source is used, it is preferably used in amounts which bring the total protein content of the filling to between about 2–20 wt-%, more preferably between 5–12 wt-% of the filling. The amount of protein added to the filling will depend on the protein content of the cheese used to make the filling.

In addition to the above components, other ingredients may be added to the savory filling of the invention. Other ingredients may be added to the base filling described above. These ingredients may be added as flavoring ingredients, or may be combined in amounts effective to characterize the filling or to impart a predominant flavor, texture or mouthfeel to the filling. Examples of characteristically flavored fillings include pizza fillings, ethnic-style fillings, and the like.

Such additives or other ingredients include natural and artificial flavoring agents such as juices, spices, herbs, extracts, meat or vegetables; coloring agents; and the like. For example, butter may also be present in the savory filling of the invention, to provide additional taste, body and other organoleptic qualities. These additional ingredients may be present in an amount ranging from about 0 to 25 wt-% of the savory filling, preferably about 15 to 20 wt-%.

One type of added ingredient is a preservative. If preservatives are used, they are present in an amount up to about 0.5 wt-%, preferably around 0.1 wt-%–0.2 wt-%. An example of a suitable preservative is potassium sorbate. Other food grade preservatives may be used as desired. One way of preserving the filling is by acidifying it using food grade acidifying agents such as lactic acid. The pH of the filling should be low enough to inhibit microbial growth, but not so low that the filling ingredients begin to precipitate. Preferably the pH of the filling is less than 7, and more preferably the pH is about 6. If an acidulant is used to achieve the desired pH, it should be selected so that it does not impart an overly tart or sour flavor to the savory filling.

The consistency of the filling determines its melting profile and processability. The filling should not be so viscous as to make processing difficult at processing temperatures with the type of equipment being used, but viscous enough to provide the desired mouthfeel and other organoleptic qualities without having the filling components separate out from each other at eating temperatures. Particularly desirable is a viscosity at eating temperatures which imparts a rich, gooey characteristic at eating temperatures without being watery or oily as a result of water or oil migration out of the filling. At an eating temperature of about 120° F., for example, suitable viscosities may range from about 70,000 centipoise to about 150,000 centipoise. Preferably, the viscosity of the filling at eating temperatures ranges from about 90,000 cps to about 130,000 cps.

As noted previously, the filling of the invention can be formulated and processed to have a consistency as desired, ranging from semi-solid to viscous at ambient temperatures. For example, if a more viscous filling is desired, a greater amount of cheese and oil can be used compared to other added ingredients, and the ingredients can be subjected to higher shear force. For fillings that are pumpable at ambient temperature (about 75° F.), the viscosity can range from 350,000 centipoise to 600,000 centipoise, and is preferably between 380,000 centipoise to 550,000 centipoise. Upon cold storage of these pumpable fillings, at about 40° F., the viscosities can range from about 1,500,000 to 5,000,000 centipoise, and is preferably between 2,000,000 to 4,000,000 centipoise. It was surprisingly discovered that the pumpable savory fillings of the invention maintain their integrity, without substantial separation of the filling components, even after the fillings are frozen and reheated for consumption.

Formulation

The savory filling of the invention may be made by any procedure that will form a stable oil and water emulsion, depending on the type of filling consistency desired.

To make a savory filling with a relatively semi-solid consistency at ambient temperatures, one procedure is to combine all the cheese in a mixing vessel and to grind the cheese, adding any oil or melted fat while grinding. The humectant, any added protein and any emulsion stabilizer are added, optionally with flavoring and coloring agents, to the vessel, and the mixture is blended to form a homogeneous blend. If desired, fat and water can be added to bring the blend to the desired consistency in the mixing vessel.

After the homogeneous blend is prepared, additional flavoring, coloring or characterizing agents can be added and mixed into the blend. The ingredients thus mixed are then cooked, optionally with low mechanical stirring action, to pasteurize the filling. After the filling is cooked, it is cooled and further stored or used as desired.

If the product is cooked in such a way as to form condensation, the condensation can be absorbed by the filling and contribute to the moisture content of the filling. If non-condensation forming cooking methods are used, then water must be added when the ingredients are combined in order to form the emulsion. By using a steam or condensation generating cooking method, however, it is possible to add all the water needed in the formula in the form of condensate, so that water need not be added in a separate step.

To make a savory filling which is flowable or pumpable at ambient temperatures, a high shear system is preferably used. The procedure generally involves preparing an oil and water emulsion first, before adding the cheese and other ingredients to make the filling.

One procedure to make a flowable filling is to prepare an emulsion by mixing the water and fat ingredients under high speed mixing. Optionally, a humectant can also be added at this stage. Preferably, the ingredients are mixed at a temperature high enough to melt the fat if it is in solid form. Then the cheese, any emulsion stabilizers, the remaining humectants, and flavors, colors or characterizing agents are added. The temperature of the product should be kept high enough to blend the ingredients, but not so high as to scorch or burn the ingredients. Preferably, the ingredients are combined at temperatures ranging between 130° F. to 170° F. The filling is then cooled and further processed or stored as desired.

When using the emulsion-based preparation method, preferably a high shear force is applied to the oil and water mixture to form and stabilize the resulting emulsion. To prepare a stable emulsion, up to about 4000 RPM of shear force can be used, preferably between about 600–3600 RPM, and more preferably between about 3000–3600 RPM.

As described above, the emulsion is made up of the water and the fat components of the filling, and may optionally include an emulsion stabilizer. As an example, the emulsion can be made from up to about 20 wt-% water (based on the total filling formula) and up to about 26% added oil or fat. If stabilizers are used, they are present in amounts up to about 5 wt-%, and preferably between about 2–3 wt-%.

The savory filling of the invention can be incorporated into a wide variety of food products. For example, the filling may be used in pies, pastries, and snacks or it may be used as a sauce or spread.

In one embodiment, a laminated dough, such as the dough described in U.S. Pat. No. 4,612,198, incorporated herein by reference, is filled with the savory filling of the invention. The dough has an initial water activity of about 0.98, and the filling preferably has a much lower water activity, for example about 0.89. Upon cooking, the dough loses water, becoming crisp and resulting in a water activity of about 0.94. Some of the water lost by cooking the crust is absorbed by the filling, raising the filling water activity to about 0.93. This product remains stable without exhibiting moisture migration into the crust, due in part to the lower water activity of the filling compared to the crust.

WORKING EXAMPLES

The savory filling of the invention is further illustrated by the examples which follow. These examples do not limit the invention in any way, as the invention is fully described by the foregoing specification and in the claims.

Example I

Preparation of a Savory Filling with Having a Semi-Solid Consistency

Flavored savory cheese-based fillings having a semi-solid consistency at room or ambient temperatures were prepared using the following ingredients:

| Flavor | Onion & Chive | Bacon Cheese | Bacon Pizza | Chicken Tikka |
|---|---|---|---|---|
| Cream Cheese | 24.00 | 16.00 | 17.00 | 15.00 |
| Cheese Base | 9.50 | 10.00 | 18.00 | 18.00 |
| Mature Cheddar | 11.00 | 7.00 | — | — |
| Cheese Curds | 10.00 | 10.00 | — | — |
| White Cheese | — | — | 10.00 | 9.00 |
| Skim Milk Powder | 1.50 | 2.00 | 1.50 | 1.50 |
| Hydrogenated Vegetable Oil | 15.00 | 15.00 | 15.00 | 15.00 |
| Salt | 1.70 | 1.55 | 1.00 | 1.80 |
| Glycerol | 7.00 | 7.00 | 7.00 | 7.00 |
| Disodium Phosphate | 0.10 | 0.10 | 0.10 | 0.10 |
| JOHA S9S[1] | 1.30 | 1.30 | 1.30 | 1.30 |
| JOHA S230[2] | 1.00 | 1.00 | 1.00 | 1.00 |
| Xanthan Gum | 0.05 | 0.05 | — | — |
| Added Water | 8.33 | 0.61 | 0.24 | 2.15 |
| Condensate Water | 7.50 | 8.00 | 8.00 | 8.00 |
| Lactic Acid | 0.20 | 0.30 | 0.40 | 0.40 |
| Meat | — | 19.00 | 12.00 | 13.50 |
| Flavoring Agents | 1.72 | 1.01 | 7.33 | 6.25 |
| Coloring Agents | 0.10 | 0.08 | 0.13 | — |

[1] JOHA S9S is a blend of sodium phosphates available from Fibrisol ® Service Limited, England, containing about 58.4 wt-% phosphate.
[2] JOHA S230 is a blend of sodium and calcium phosphates available from Fibrisol ® Service Limited, England, containing about 58.8 wt-% phosphate.

These savory fillings were prepared by mixing all the cheese ingredients, including the cream cheese, in a steam injected cooking vessel and grinding the ingredients, adding the oil during the grinding step. The skim milk powder, salt, disodium phosphate, phosphate salts, xanthan gum if used, added water, lactic acid, and the colors and flavors were then added to the ground cheese and oil mixture, and the entire mixture was homogenized to form a substantially uniform blend. The entire blend was then cooked in the steam injected cooker at about 80° C. for a time sufficient to pasteurize the product. Glycerol was added at the cooking step. Depending on the desired flavor, the meat component was also added at the cooking step. The resulting product was then cooled and further processed or stored as desired.

The fillings made in this Example are suitable for use with conventional semi-solid food extruders to incorporate the filling into a food product.

Example II

Preparation of a Savory Filling Having a Flowable Consistency

Savory cheese-based fillings having a flowable or pumpable viscosity at room temperatures were prepared using the following ingredients:

| | Formula I | Formula II |
|---|---|---|
| Cream Cheese | 49.86 | 44.34 |
| Mild Cheddar | 20.00 | — |
| Medium Cheddar | — | 18.00 |
| Soybean Oil | 14.70 | 15.00 |
| Water | 3.00 | 5.98 |
| Glycerol | 6.00 | 6.00 |

-continued

|  | Formula I | Formula II |
|---|---|---|
| Cheese Powder | — | 4.00 |
| Butter | 2.79 | 2.79 |
| Salt | 2.00 | 1.25 |
| Disodium Phosphate | 0.70 | 1.65 |
| Sodium Hexametaphosphate | 0.70 | 0.70 |
| Sodium Stearoyl Lactate | 0.20 | — |
| Potassium Sorbate | — | 0.10 |
| Flavoring Agents | — | 0.19 |
| Coloring Agents | 0.05 | — |

These fillings were made either in a batch process or a continuous recirculating process. In the batch process, the water, oil and butter were combined in a steam jacketed mixing bowl, mixed under high shear and heated to about 135° F. If sodium stearoyl lactate was used, it was then added and mixed for about 2 minutes, heating to about 150° F. The cream cheese was then added, and the resulting mixture mixed for about 5 minutes, at a temperature of about 135° F.

At this point, the salt, disodium phosphate and sodium hexametaphosphate, and optionally, the cheese powder, were added and mixed for about 3 minutes, heating to a temperature of about 145° F. Cheddar cheese was added and mixed for 5 minutes, with the temperature of the mixture maintained at about 150° F. The glycerol was then added, mixed for about 3 minutes, keeping the temperature at about 155° F. Finally, the colors and any added flavoring agents were added and the resulting final mixture mixed for about 4 minutes, maintaining the temperature between about 155–160° F.

In a continuous process, the water, oil, butter and glycerol are added to jacketed mix kettle, and the kettle jacket temperature set to about 200° F. The ingredients are mixed using a recirculation loop with a Tri-Blender™ brand high shear mixer, available from TriClover, Inc. of Kenosha, Wis. As the ingredients are recirculating, if potassium sorbate is used, it is added and thoroughly mixed with the ingredients. The mixture is processed until all the butter has melted and the slurry temperature is about 135° F. The recirculation loop is turned off, and cream cheese cubes are added. The mixture is mixed by recirculating through the recycle loop with the high speed mixer off, until the cream cheese is melted and is at a temperature of 145° F. When the cream cheese is melted, the high speed mixer is turned back on.

At this point, the stabilizers (sodium hexametaphosphate, disodium phosphate and if used, sodium stearoyl lactate) salt, cheese powder, and flavoring and coloring agents are added. The mixture is recirculated until the temperature reaches 155° F. Diced cheddar cheese is added and the combination is mixed until the temperature reaches 165° F. The combination is mixed for about another 2 minutes, then pumped to a hold tank at about 130° F. The filling is then pumped from the hold tank through heat exchangers, reducing the temperature of the filling to about 80° F., pumped to suitable storage containers, and finally cooled to about 40° F. for storage or further use as desired.

The fillings made in this Example have viscosities that make them suitable for pumping into or onto food products using conventional pumping apparatus.

The viscosity versus temperature profile of a filling made using Formula II in a continuous recirculation process is shown in FIG. 1. The filling, after being made and cooled down to 40° F., was reheated, and viscosity readings were taken at 40° F., 80° F., 120° F. and 165° F. using a model RVTDV II Brookfield Viscometer, available from Brookfield Engineering Laboratories, Stoughton, Mass., with a T-F spindle set at 1 RPM speed. The extremely sharp viscosity profile achieved with a filling of the invention exhibits its ability to attain the desired controlled melting profile at eating temperatures, substantially without separation of the filling ingredients.

We claim:

1. A savory filling which has a controlled melting profile, said filling comprising:
   (a) an amount of cheese effective to provide melting and organoleptic properties to the filing;
   (b) a fat or oil in an amount effective to control the consistency of the filling, the fat or oil being present in an amount of 10 to 30 wt-%;
   (c) a humectant in an amount effective to reduce the water activity of the filling;
   (d) an effective amount of an emulsion stabilizer; and
   (e) a total water content from all sources of 10 to 60 wt-%; wherein the filling has a viscosity of 70,000 cps to 200,000 cps at eating temperatures above about 100° F.

2. The filling of claim 1 further comprising an added protein in an amount effective to build dairy quality or protein content in the filling.

3. The filling of claim 1 wherein the cheese is selected from the group consisting of cheddar, colby, Swiss, gruyere, brie, limburger, mozzarella, white, Neufchatel, Emmenthal, Parmesan, full fat soft cheese, cream cheese, and combinations thereof.

4. The filling of claim 1 wherein the cheese is a combination of cream cheese and cheddar cheese.

5. The filling of claim 1 wherein the fat or oil is selected from the group consisting of vegetable oil, corn oil, cottonseed oil, coconut oil, peanut oil, soybean oil, palm kernel oil, sunflower seed oil, or a combination thereof.

6. The filling of claim 1 wherein the fat or oil comprises at least one of vegetable oil, corn oil, and soybean oil.

7. The filling of claim 1 wherein the humectant is selected from the group consisting of salt, glycerol, carboxymethylcellulose, or a combination thereof.

8. The filling of claim 1 wherein the humectant is a combination of salt and glycerol.

9. The filling of claim 1 wherein the emulsion stabilizer is selected from the group consisting of disodium phosphate, sodium stearoyl lactate, sodium hexametaphosphate, xanthan gum, calcium phosphate, or a combination thereof.

10. The filling of claim 1 further comprising a coloring agent.

11. The filling of claim 1 further comprising a flavoring agent.

12. The filling of claim 1 wherein the water activity of the filling is about 0.80 to 0.95.

13. A food product that contains the filling of claim 1.

14. A savory filling which is viscous at eating temperatures and has a water activity of about 0.80 to 0.95, the filling comprising:
   (a) at least about 20 wt-% cheese;
   (b) about 10 to 30 wt-% oil or fat;
   (c) about 2 to 20 wt-% humectant;
   (d) no more than 5 wt-% of an emulsion stabilizer; and
   (e) a total water content from all sources of 10 to 60 wt-%.

15. The filling of claim 14 further comprising added dairy protein in an amount of about 0.5–9 wt-%.

16. The filling of claim 14 wherein the cheese is selected from the group consisting of cheddar, colby, Swiss, gruyere, brie, limburger, mozzarella, white, Neufchatel, Emmenthal, Parmesan, full fat soft cheese, cream cheese, and combinations thereof.

17. The filling of claim 14 wherein the cheese is a combination of cream cheese and cheddar cheese.

18. The filling of claim 14 wherein the fat or oil is selected from the group consisting of vegetable oil, corn oil, soybean oil, or a combination thereof.

19. The filling of claim 14 wherein the fat or oil is hydrogenated vegetable oil.

20. The filling of claim 14 wherein the humectant is selected from the group consisting of salt, glycerol, carboxymethylcellulose, or a combination thereof.

21. The filling of claim 14 wherein the humectant is a combination of salt and glycerol.

22. The filling of claim 14 wherein the emulsion stabilizer is selected from the group consisting of disodium phosphate, sodium stearoyl lactate, sodium hexametaphosphate, xanthan gum, calcium phosphate, or a combination thereof.

23. A savory filling having a water activity of about 0.80 to 0.95, the filling comprising:
    (a) about 40 to 50 wt-% cream cheese;
    (b) about 15 to 25 wt-% cheddar cheese;
    (c) about 12 to 17 wt-% oil;
    (d) about 6 to 15 wt-% humectants, the humectants comprising about 1 to 4 wt-% salt and about 5 to 10 wt-% glycerol, based on the total filling weight;
    (e) no more than 5 wt-% emulsion stabilizers, the stabilizers comprising about 0 to 0.5 wt-% sodium stearoyl lactate, about 0 to 2.0 wt-% disodium phosphate, and about 0.5 to 1.0 wt-% sodium hexametaphosphate, based on the total filling weight;
    (f) about 1 to 5 wt-% butter, wherein the filling is free of added sweetening agents; and
    (g) a total water content from all sources of 10 to 60 wt-%.

24. A baked good containing a savory filling which is flowable at eating temperature, said filling comprising:
    (a) at least about 40 wt-% cheese;
    (b) an oil in an amount effective to control the consistency of the filling, the oil being present in an amount of 10 to 30 wt-%;
    (c) a humectant in an amount effective to reduce the water activity of the filling;
    (d) an effective amount of an emulsion stabilizer, wherein the filling has a viscosity of about 90,000 cps to 130,000 cps at an eating temperature of about 120° F. and a viscosity of about 380,000 to 550,000 cps at an ambient temperature of about 75° F.; and
    (e) total water content from all sources of 10 to 60 wt-%.

25. The baked good of claim 24 wherein the filling further comprises butter in an amount of about 1 to 20 wt-%.

26. The baked good of claim 24 wherein the cheese is selected from the group consisting of cheddar, colby, Swiss, gruyere, brie, limburger, mozzarella, white, Neufchatel, Emmenthal, Parmesan, full fat soft cheese, cream cheese, and combinations thereof.

27. The baked good of claim 24 wherein the cheese is a combination of cream cheese and cheddar cheese.

28. The baked good of claim 24 wherein the fat or oil is selected from the group consisting of vegetable oil, corn oil, soybean oil, or a combination thereof.

29. The baked good of claim 24 wherein the fat or oil is hydrogenated vegetable oil.

30. The baked good of claim 24 wherein the humectant is selected from the group consisting of salt, glycerol, carboxymethylcellulose, or a combination thereof.

31. The baked good of claim 24 wherein the humectant is a combination of salt and glycerol.

32. The baked good of claim 24 wherein the emulsion stabilizer is selected from the group consisting of disodium phosphate, sodium stearoyl lactate, sodium hexametaphosphate, xanthan gum, calcium phosphate, or a combination thereof.

33. The filling of claim 32, wherein the cheese further comprises at least one of cheddar, colby, Swiss, gruyere, brie, limburger, mozzarella, white, Neufchatel, Emmenthal, Parmesan, and full-fat soft cheese.

34. A savory filling that has a water activity of 0.80 to 0.95, said filling comprising:
    (a) a cheese in an amount of at least about 20 wt-%;
    (b) a fat or oil in an amount effective to control the consistency of the filling;
    (c) a humectant in an amount of 2 to 20 wt-%;
    (d) an emulsion stabilizer in an amount of no more than 5 wt-%; and
    (e) a total water content from all sources of 10 to 60 wt-%, wherein the total fat from the cheese and the fat or oil is 30 to 50 wt-%.

35. The filling of claim 34, wherein the cheese comprises cream cheese.

36. The filling of claim 34, wherein the filling has a viscosity of between about 70,000 cps and 200,000 cps at eating temperatures above about 100° F.

37. The filling of claim 34, wherein the fat or oil comprises at least one of vegetable oil, corn oil, cottonseed oil, coconut oil, peanut oil, soybean oil, palm kernel oil, and sunflower seed oil.

38. The filling of claim 34, wherein the humectant comprises glycerol.

39. The filling of claim 34, wherein the emulsion stabilizer comprises at least one of disodium phosphate, sodium stearoyl lactate, sodium hexametaphosphate, xanthan gum, and calcium phosphate.

40. The filling of claim 34, wherein the filling further comprises at least one of a coloring agent and a flavoring agent.

41. The filling of claim 34, wherein the filling further comprises protein in an amount effective to provide a matrix in the filling.

\* \* \* \* \*